United States Patent [19]

Lowder

[11] 4,360,987
[45] Nov. 30, 1982

[54] GNAT TRAP

[76] Inventor: James Lowder, 6709 Oakfield, NE., East Canton, Ohio 44730

[21] Appl. No.: 245,198

[22] Filed: Mar. 18, 1981

[51] Int. Cl.³ .............................................. A01M 1/10
[52] U.S. Cl. ....................................................... 43/122
[58] Field of Search .................. 43/107, 113, 114, 122, 43/131, 118

[56] References Cited

U.S. PATENT DOCUMENTS

| 105,963 | 8/1870 | Merk | 43/122 |
|---|---|---|---|
| 117,489 | 7/1871 | Victor | 43/107 |
| 128,982 | 7/1872 | Skeen | 43/122 |
| 420,490 | 2/1890 | Barnard | 43/122 |
| 1,091,550 | 3/1914 | Walters | 43/122 |
| 1,419,859 | 6/1922 | Keckler | 43/118 |
| 4,218,842 | 8/1980 | Anderson | 43/122 |
| 4,328,636 | 5/1982 | Johnson | 43/122 |

FOREIGN PATENT DOCUMENTS 85185 3/1955 Norway ................................ 43/122

Primary Examiner—Gus T. Hampilos
Assistant Examiner—M. Jordan
Attorney, Agent, or Firm—Frease & Bishop

[57] ABSTRACT

A trap for catching and destroying small flying gnats consists of two main components, namely, top and bottom transparent chambers. The top chamber is removably mounted in a spaced relationship on the bottom chamber. The bottom wall of the top chamber is formed with a large central opening defined by an externally threaded cylindrical sleeve which is engaged within a complementary-shaped internally threaded cylindrical sleeve which surrounds a large central opening formed in the top wall of the bottom chamber. A plurality of small holes are formed in the bottom wall of the top chamber and are spaced about the large central opening. A fermenting liquid which is attractive to gnats is contained in the bottom chamber. The odor of the liquid escapes through the small holes and attracts the gnats which fly into the top chamber through the small holes where they become trapped and subsequently die and fall into the liquid in the bottom chamber. The holes are of a sufficient size to enable the gnats to enter the trap but small enough to restrict their escape therefrom.

9 Claims, 5 Drawing Figures

GNAT TRAP

BACKGROUND OF THE INVENTION

1. Field of the Invention

The invention relates to an insect trap and particularly to a trap for small fying gnats. More particularly, the invention relates to an inexpensive and attractive trap which is filled with a fermenting liquid for attracting gnats into the trap where they subsequently become entrapped and die.

2. Description of the Prior Art

Various traps have been constructed for trapping insects such as flies, moths, beetles and the like. Many of these prior traps use a fermenting liquid, the odor of which attracts the insects into the trap where they are unable to easily escape therefrom and subsequently die. Examples of such traps are shown in U.S. Pat. Nos. 105,963, 117,489, 128,982, 420,490 and 1,091,550. Although these traps are believed to perform satisfactorily for trapping and killing the insects, most of these prior trap constructions are of an unattractive and relatively expensive construction due to the irregular shapes and complicated configurations thereof. This deters many people from purchasing the same or for placing them in their homes for use.

Accordingly, there is a need for an inexpensive, attractive trap which can be placed in the user's dwelling and which will attract small flying gnats from within the surrounding area into the trap where they subsequently become entrapped and die. There is no known gnat trap of which I am aware which accomplishes these results.

SUMMARY OF THE INVENTION

Objectives of the invention include providing a gnat trap assembled from a pair of inexpensive chambers formed of a transparent material such as glass or plastic, which are removably attached to each other by male and female threaded sleeves which surround central openings formed in the bottom wall of the top chamber and in the top wall of the bottom chamber, which openings provide communication between the chambers. Another object is to provide such a gnat trap in which the bottom wall of the top chamber is spaced above the top wall of the bottom chamber, with a plurality of small holes being formed in the bottom wall of the top chamber through which the gnats enter the top chamber, said gnats being attracted thereinto by the odor of a fermenting liquid stored in the bottom chamber. The gnats upon entering the upper chamber subsequently die and fall into the liquid of the bottom chamber. Another object is to provide such a gnat trap which is easily disassembled for cleaning the chambers and refilling the bottom chamber with a fresh supply of a fermenting liquid by engagement of the threaded sleeves of the top and bottom chambers. Another object of the invention is to provide such a gnat trap which is of an extremely simple, effective and inexpensive construction which solves problems and satisfies needs existing in the art.

These and other objectives and advantages may be obtained by the improved gnat trap, the general nature of which may be stated as including a bottom chamber having top, bottom and side walls, said bottom chamber being adapted to contain a quantity of liquid, the odor of which is attractive to gnats; a top chamber having top, bottom and side walls, said top chamber being mounted on and supported by the top wall of the bottom chamber with at least a portion of said bottom wall of the top chamber being spaced from the top wall of the bottom chamber; a first large opening formed generally in the center of the bottom chamber top wall and a second large opening formed in the center of the top chamber bottom wall, said large openings being in alignment with each other providing communication between said top and bottom chambers; and a plurality of small holes formed in the bottom wall of the top chamber and spaced about the large opening in said bottom wall, said small holes permitting the odor of the liquid in the bottom chamber to escape from the chambers to attract gnats into said chambers through the small holes, with said small holes being of sufficient size to permit gnats to enter the top chamber yet restrict their exiting therefrom whereupon the gnats become entrapped in said chambers and subsequently die.

BRIEF DESCRIPTION OF THE DRAWING

A preferred embodiment of the invention—illustrative of the best mode in which applicant has contemplated applying the principles—is set forth in the following description and shown in the drawing and is particularly and distinctly pointed out and set forth in the appended claims.

Similar numerals refer to similar parts throughout the drawing.

DESCRIPTION OF THE PREFERRED EMBODIMENT

Figure 1:
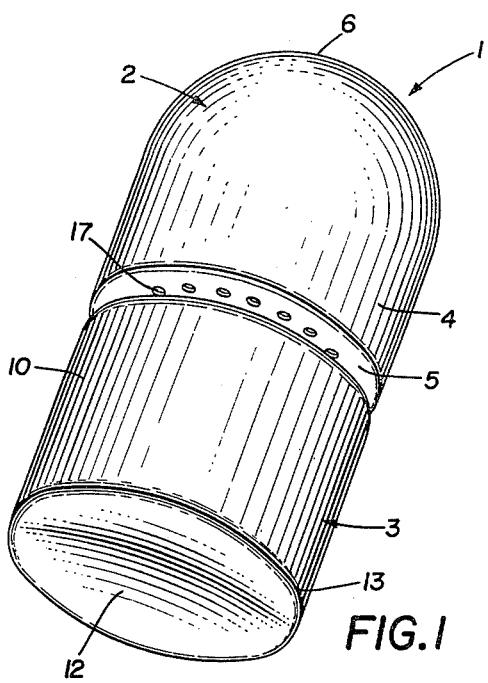
FIG. 1 is a perspective view of the improved gnat trap construction.

The improved gnat trap is indicated generally at 1, and is shown in FIG. 1 in an assembled, operative condition. Gnat trap 1 consists of two main components, namely, a top chamber 2 and a bottom chamber 3. Top chamber 2 is formed by a cylindrical-shaped side wall 4, a flat, planar disc-shaped bottom wall 5, and a dome-shaped top wall 6. A large central opening 7 is formed in bottom wall 5 and is surrounded and defined by an outwardly projecting externally threaded sleeve 8.

Bottom chamber 3 has a cylindrical configuration formed by cylindrical side wall 10, a flat, planar disc-shaped top wall 11 and a bottom wall 12. Bottom wall 12 preferably has a concave configuration with an annular-shaped outer edge 13, formed at the junction of bottom wall 12 and side wall 10, forming a base for supporting trap 1. A large central opening 14 is formed in top wall 11 and is surrounded and defined by an outwardly projecting, internally threaded sleeve 15 which is complementary to externally threaded sleeve 8 of top chamber 2 for removably connecting top and bottom chambers 2 and 3.

Figure 4:
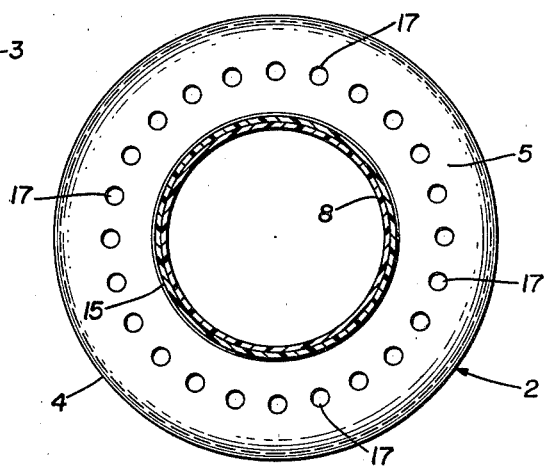
FIG. 4 is a horizontal sectional view of the coupling connection between the top and bottom chambers taken on line 4—4, FIG. 2.
Figure 3:
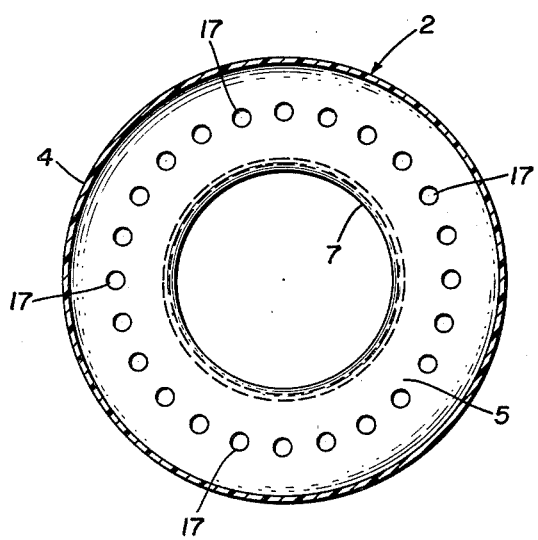
FIG. 3 is a horizontal sectional view of the top chamber taken on line 3—3, FIG. 2.
Figure 5:
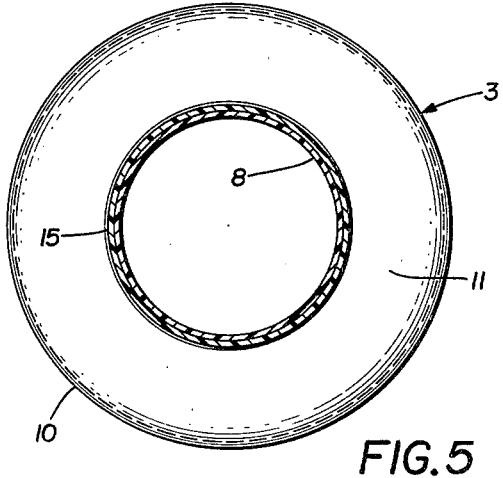
FIG. 5 is a sectional view taken on line 5—5, FIG. 2.

In accordance with one of the features of the invention, a plurality of small holes 17 (FIGS. 3 and 4) are formed in bottom wall 5 of top chamber 2 and are spaced in a circular configuration about central opening 7. Holes 17 are of an extremely small size, approximately ⅛ inch, which is just large enough to enable a gnat to pass through the holes and into the interior of chamber 2, yet small enough to prevent the gnat from readily escaping from chamber 2.

Chambers 2 and 3 preferbly are formed of a transparent molded plastic material which can be mass produced in large quantities at an extremely low cost. Such a construction provides a device which is pleasing in appearance, sturdy and durable in use, and which can be cleaned easily by washing with soap and water after an extended period of use.

Figure 2:
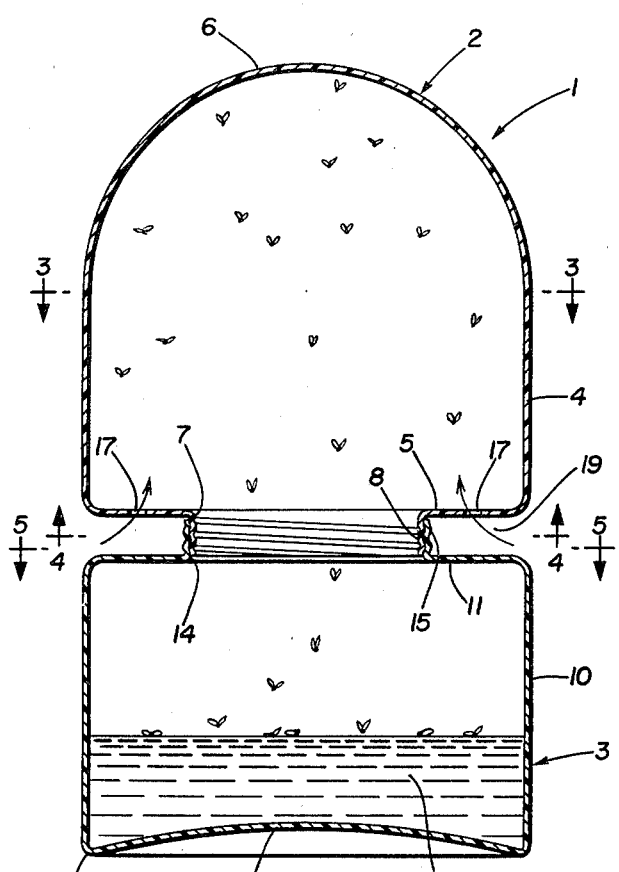
FIG. 2 is an enlarged vertical sectional view of the gnat trap of FIG. 1.

The operation of gnat trap 1 is readily seen by an inspection of FIG. 2. A quantity of a fermenting liquid 18, such as vinegar, fruit juice, or vegetable juice, is placed in the lower portion of chamber 3. The odor of the fermenting liquid passes through aligned large central openings 7 and 14 filling the interior of chamber 2 and subsequently passing out of chamber 2 through hole 17 and into the surrounding atmosphere. The gnats are attracted by the odor and enter chamber 2 through holes 17 where they become entrapped, and after an extended period of time will fall through aligned openings 7 and 14 and into fluid 18 where they subsequently die. Since gnats are not a crawling insect, it makes it extremely difficult for them to escape chamber 2 through holes 17. Periodically liquid 18 can be replaced with a new supply of a fermenting liquid by unscrewing top chamber 2 from chamber 3 enabling the chambers to be conveniently cleaned in hot soapy water, whereupon they can be easily reassembled after partially filling bottom chamber 3 with a new liquid supply.

In accordance with one of the features of the invention, the spacing of top chamber bottom wall 5 from top wall 11 of bottom chamber 3 forms an annular ledge about the central openings in which holes 17 are formed. This eliminates any externally visible holes yet provides easy access into the interior of chamber 2 for the attracted gnats.

One preferred size of trap 1 consists of chamber 3 having a vertical height of approximately two inches and chamber 2 having a vertical height of approximately three inches with the diameters of chambers 2 and 3 being generally equal to each other approximately three inches in diameter. Openings 7 and 14 have a radius of approximately 1½ inches, with the gap 19 that is formed between walls 5 and 11 being approximately 3/16 inch. Holes 17 are formed generally in the center of the annular ledge provided by bottom wall 5 of top chamber 2.

The above-described configuration and size of trap 1 is for illustration only and the invention should not be so limited to this configuration and dimensions. For example, chambers 2 and 3 may be formed of glass jars in which the lids thereof are removably connected together after central openings are formed in the lids. With this configuration, the lids can be spaced vertically above each other with the gnat holes being formed in the lid of the top jar in the annular area surrounding the central opening. Alternatively, the lids can be placed in abutting relationship with the top jar being of a larger diameter than the smaller jar, whereupon an annular ledge is provided in the lid of the top jar which is spaced horizontally outwardly from the bottom jar. The access holes 17 are formed in this outwardly extending ledge. This arrangement provides the same features and advantages as the above-described preferred embodiment.

Also, chambers 2 and 3 of trap 1 may be formed entirely of metal or a combination of metal, plastic and glass. They also can be produced in opaque or attractive colors and have rectangular or other cross-sectional configurations. The main feature is the formation of a pair of enclosed chambers removably connected together with the only access into the trap being a plurality of holes formed in an annular ledge formed in the bottom wall of the top chamber which is spaced either vertically or horizontally from the top wall of the bottom chamber. This enables the gnats to fly into the upper odor-filled chamber 2 for subsequent entrapment and subsequent collection in lower liquid-filled chamber 3.

Trap 1 provides an attractive unit which can be placed on a table, cabinet or other suitable support in a home, which will attract and entrap gnats from the surrounding atmosphere without giving an unattractive appearance to the home, and which will not even be noticed by visitors in the home. Trap 1 can be mass produced in large quantities, and if formed of plastic will be relatively unbreakable. If desired, trap 1 can be made in various colors enabling the home owner to match the particular decor of the room in which the trap will be used. Furthermore, liquid 18 is readily available vinegar or fermenting juices of the type found in most households, eliminating the need for expensive bait as in other types of trap constructions. Furthermore, the device can be disassembled easily by unscrewing the two chambers for subsequent cleaning and refill, not possible with most prior trap constructions.

Accordingly, the improved gnat trap is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding, but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved gnat trap is constructed and used, the characteristics of the construction, and the advantageous, new and useful results obtained; the new and useful structures, devices, elements, arrangements, parts, and combinations, are set forth in the appended claims.

I claim:
1. A gnat trap including:
 (a) a bottom chamber having top, bottom and side walls, said bottom chamber being adapted to contain a quantity of liquid, the odor of which is attractive to gnats;
 (b) a top chamber having top, bottom and side walls, said top chamber being mounted on and supported by the top wall of the bottom chamber with at least a portion of said bottom wall of the top chamber being spaced from the top wall of the bottom chamber;
 (c) a first large opening formed generally in the center of the bottom chamber top wall and a second large opening formed in the center of the top chamber bottom wall, said large openings being in alignment with each other providing communication between said top and bottom chambers; and (d) a plurality of small holes formed in the bottom wall of the top chamber and spaced about the large opening in said bottom wall, said small holes permitting the odor of the liquid in the bottom chamber to escape from the chambers to attract gnats into said chambers through the small holes, with said small holes being of sufficient size to permit gnats to enter the top chamber yet restrict their exiting therefrom whereupon the gnats become entrpped in said chambers and subsequently die.

2. The gnat trap defined in claim 1 in which the first and second large openings are defined by cylindrical sleeves; in which one of said cylindrical sleeves is externally threaded and the other of said cylindrical sleeves is internally threaded; and in which said threaded sleeves are cooperatively engaged with each other to removably mount the top chamber on the bottom chamber.

3. The gnat trap defined in claim 1 in which the top and bottom chamber forming walls are formed of a transparent material.

4. The gnat trap defined in claim 1 in which the small holes formed in the bottom wall of the top chamber are arranged in a circular configuration.

5. The gnat trap defined in claim 1 in which the top and bottom chambers have cylindrical configurations, the diameters of which are approximately equal to each other.

6. The gnat trap defined in claim 5 in which the top wall of the top chamber has a dome-shaped configuration.

7. The gnat trap defined in claim 5 in which the bottom wall of the bottom chamber has an outer annular area which forms a base for supporting the trap.

8. The gnat trap defined in claim 1 in which the top and bottom chambers are formed of a plastic material.

9. The gnat trap defined in claim 1 in which the bottom wall of the top chamber is spaced vertically above the top wall of the bottom chamber.

* * * * *